Nov. 4, 1941.  J. H. RAND, JR., ET AL  2,261,660
DRY SHAVER
Filed June 1, 1938

INVENTORS
J. H. RAND, JR.
A. M. ROSS
BY *W. A. Sparks*
ATTORNEY

Patented Nov. 4, 1941

2,261,660

UNITED STATES PATENT OFFICE 2,261,660

DRY SHAVER

James Henry Rand, Jr., Stamford, Conn., and Albert Miller Ross, Garden City, N. Y., assignors, by mesne assignments, to Remington Rand, Inc., Buffalo, N. Y., a corporation of Delaware Application June 1, 1938, Serial No. 211,302

3 Claims. (Cl. 30—43)

This invention relates to improvements in the shearing head for dry shavers, and more particularly to the arrangement of the cutting edges in the cutters comprising said head.

This type of shearing head is used in razors of the type disclosed and described in Patent No. 2,134,134, issued October 25, 1938 to H. Landsiedel.

The shearing head comprises an outer cutter which is removably secured to a casing or handle of the device. Slidably mounted in the outer cutter is an inner cutter which is adapted to be reciprocated by any well known driving means in the handle.

As disclosed in the above patent and as is well known in the art, the inner and outer cutters have shearing members formed by cutting slots in the inner and outer cutters. These slots have been found to be satisfactory for cutting long hair, but due to their structure the metal thereof had to be of considerable thickness, therefore they are not found to be satisfactory for cutting the short hairs of the face.

In a shearing head of this type, the thinner the metal of the outer cutter is at the point of shearing, the closer to the skin the hair will be cut.

If the metal of an outer cutter containing slots for forming the shearing members is made sufficiently thin to give a close shave, then the whole cutter is weakened.

It is obvious that a series of perforations forming shearing members in the outer cutter, will not weaken the structure to such an extent as would slots.

It is, therefore, the principal object of this invention to provide an outer cutter in which a combination of perforations and slots is provided to form the shear members.

A further object is to provide a central web or land in the upper surface of an outer cutter in which there are neither slots nor perforations, thereby forming a reinforcement for the cutter.

A more clear conception of the construction, operation, and further objects of the invention may be had from the following specification taken in conjunction with the accompanying drawing, in which Fig. 1 is a plan view of a portion of a shearing head having an outer cutter in which alternate rows of slots and perforations are disposed diagonally to form shearing members, the outer cutter being broken away to disclose the inner cutter;

Figure 1:
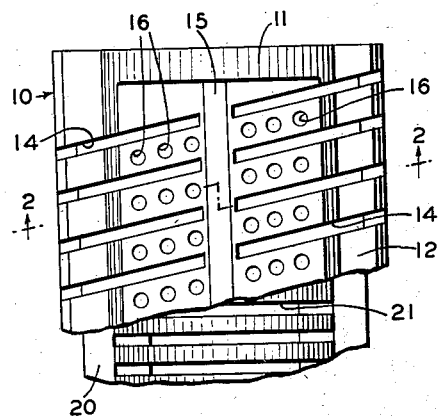

The shearing head is adapted to be removably secured in a casing forming a handle in which is mounted a motor. A slot is formed in the outer cutter of the shearing head, through which any suitable means, such as an eccentric shaft or reciprocating arm, may extend into engagement with the inner cutter to cause it to be reciprocated.

As disclosed in the drawing the outer cutter 10 is formed of a substantially U-shaped metal block having a circular bore in which is positioned an inner cutter 20 of substantially tube shape.

Figure 2:
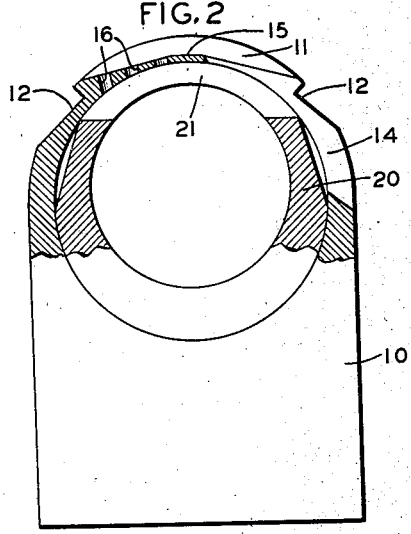
Fig. 2 is a cross section through 2—2 of Fig. 1.

Referring to Figs. 1 and 2, the outer cutter 10 is formed of a block of metal having an arcuate upper surface, which is ground away in the center thereof to form a ridge of metal 11 at each of the ends thereof. The surfaces at 12 are ground away to form hook shaped combing members. The surface between the ridges 11 is cut through to form diagonal slots 14, which extend a portion of the way down the sides of the cutter and end at a central web 15. In the upper surfaces between the slots, which surfaces have been ground flat, perforations 16 are formed.

The inner cutter 20 is formed of a tube of metal having an eccentric bore. In the thinnest portion of the tube slots 21 are cut which extend at right angles to the longitudinal axis of the tube. These slots are cut in only a small arc of the tube. The side surfaces of the tube below the slots are ground flat to reduce the friction between the cutters, and to insure perfect contact between the cutting edges.

The slots 14 are provided to engage and comb long hair into engagement with the slots 21. The edges of both slots 14 and 21 form shearing edges which cut the hair as the inner cutter reciprocates. The edges of the perforations 16 also form shearing members. After the long hair has been cut by the edges of the slots, as the razor is drawn over the skin the short hairs enter the perforations where they are cut off close to the skin. It is obvious that only hair of a certain length will enter the perforations; therefore, the provision of the slots in combination with the perforations insures that all the hair will be cut. Due to the fact that both perforations and slots are disposed at an angle to the line of travel of the razor over the skin, all hair in that particular area is combed in and cut. A very efficient shearing action is secured with the slots 14 located at an angle to the slots 21. The central web 15 forms a reinforcing member which keeps the center of the outer cutter rigid.

Figure 3:
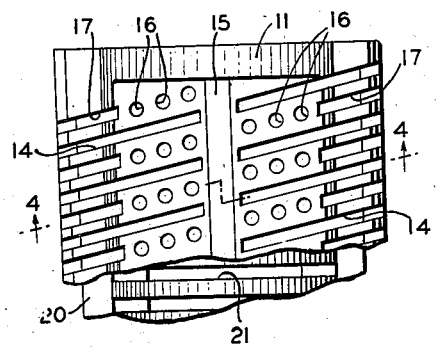
Fig. 3 is a plan view of a portion of a shearing head similar to that in Fig. 1 except that additional slots are formed in the ends of the blades containing the perforations.
Figure 4:
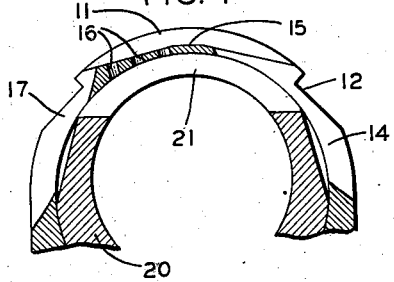
Fig. 4 is a cross section through 4—4 of Fig. 3.

Figs. 3 and 4 disclose a similar type of razor in which additional slots 17 are provided in the sides of the outer cutter for increasing the combing action. The inner cutter is the same as in Figs. 1 and 2.

While we have desribed what we consider to be a highly desirable embodiment of our invention, it is obvious that many changes in form could be made without departing from the spirit of our invention, and we, therefore, do not limit ourselves to the exact form herein shown and described, except as necessitated by the prior art and the scope of the appended claims.

What we claim as new, and desire to secure by Letters Patent, is:

1. A shearing head of the type described comprising a cylindrical outer cutter having a longitudinal web on its upper face, a combination of slots and perforations disposed on each side of said web and forming shearing members, said slots extending from said web partly down the walls thereof, said perforations being disposed on the top thereof and interspaced between said slots, and a cylindrical inner cutter adapted to be reciprocated across the inner openings of said slots and perforations.

2. A shearing head of the type described comprising a cylindrical outer cutter having a longitudinal web on its upper face, a combination of slots and perforations disposed at oblique angles on each side of said web and forming shearing members, said slots extending from said web partly down the walls thereof, said perforations being disposed on the top thereof between said slots, and a cylindrical inner cutter adapted to be reciprocated across the inner openings of said slots and perforations.

3. A shearing head of the type described comprising a cylindrical outer cutter having a longitudinal web on its upper face, a combination of slots and perforations on each side of said web, said perforations being disposed on the top surface thereof, a group of said slots extending from said web partly down the upper walls thereof and another group of said slots being adjacent to said perforated surface and extending partly down the upper walls of said cutter, and a cylindrical inner cutter reciprocally mounted to move across the inner openings of said slots and perforations.

JAMES HENRY RAND, Jr.
ALBERT MILLER ROSS.